(12) United States Patent
Hartmann

(10) Patent No.: US 9,132,857 B2
(45) Date of Patent: Sep. 15, 2015

(54) METHOD OF OPERATING A MOTOR VEHICLE HAVING A PARKING ASSISTANCE SYSTEM

(71) Applicant: Audi AG, Ingolstadt (DE)

(72) Inventor: Jürgen Hartmann, Gutenstetten (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/371,105

(22) PCT Filed: May 25, 2013

(86) PCT No.: PCT/EP2013/001549
§ 371 (c)(1),
(2) Date: Jul. 8, 2014

(87) PCT Pub. No.: WO2013/189563
PCT Pub. Date: Dec. 27, 2013

(65) Prior Publication Data
US 2014/0350786 A1 Nov. 27, 2014

(30) Foreign Application Priority Data
Jun. 20, 2012 (DE) .......... 10 2012 012 265

(51) Int. Cl.
*B62D 15/02* (2006.01)
*G08G 1/16* (2006.01)

(52) U.S. Cl.
CPC .......... *B62D 15/027* (2013.01); *B62D 15/0285* (2013.01); *G08G 1/16* (2013.01); *G08G 1/168* (2013.01)

(58) Field of Classification Search
CPC .. B62D 15/027; B62D 15/0285; G08G 1/168; G08G 1/16
USPC .................. 701/36, 99, 101, 102, 30.3, 30.4; 340/932.2
See application file for complete search history.

(56) References Cited

U.S. PATENT DOCUMENTS

| 8,126,625 | B2 * | 2/2012 | Makino et al. .................. 701/65 |
| 2003/0150661 | A1 * | 8/2003 | Kataoka et al. ............... 180/204 |
| 2010/0049413 | A1 * | 2/2010 | Makino et al. .................. 701/65 |
| 2010/0114438 | A1 * | 5/2010 | Makino et al. .................. 701/48 |
| 2010/0329510 | A1 | 12/2010 | Schmid |
| 2011/0080304 | A1 | 4/2011 | Toledo et al. |
| 2011/0241857 | A1 | 10/2011 | Brandenburger et al. |

FOREIGN PATENT DOCUMENTS

| DE | 102 37 718 | 2/2004 |
| DE | 102005017359 | 11/2005 |

(Continued)

OTHER PUBLICATIONS

International Search Report issued by the European Patent Office in International Application PCT/EP2013/001549 on Aug. 16, 2013.

*Primary Examiner* — Russell Frejd
(74) *Attorney, Agent, or Firm* — Henry M. Feiereisen LLC

(57) ABSTRACT

A motor vehicle includes an internal combustion engine and a parking assistance system with a system controller. During the assisted performance of a parking maneuver, the system controller receives one or more pieces of information from other controllers or units, which is continuously stored in the system controller. When restarting the internal combustion engine that has previously stalled during the ongoing parking maneuver, information previously stored by the system controller is accessed and forms the basis of a continued parking maneuver during a defined time interval, after which the assistance is once again based on current information acquired from the controllers or units.

7 Claims, 2 Drawing Sheets

(56) References Cited

FOREIGN PATENT DOCUMENTS

| | | |
|---|---|---|
| DE | 102007036251 | 2/2009 |
| DE | 102008003662 | 7/2009 |
| DE | 102008001648 | 11/2009 |
| DE | 102009028760 | 2/2011 |
| DE | 102010037300 | 4/2011 |
| DE | 102010020202 | 11/2011 |
| WO | WO 2011/020784 | 2/2011 |

* cited by examiner

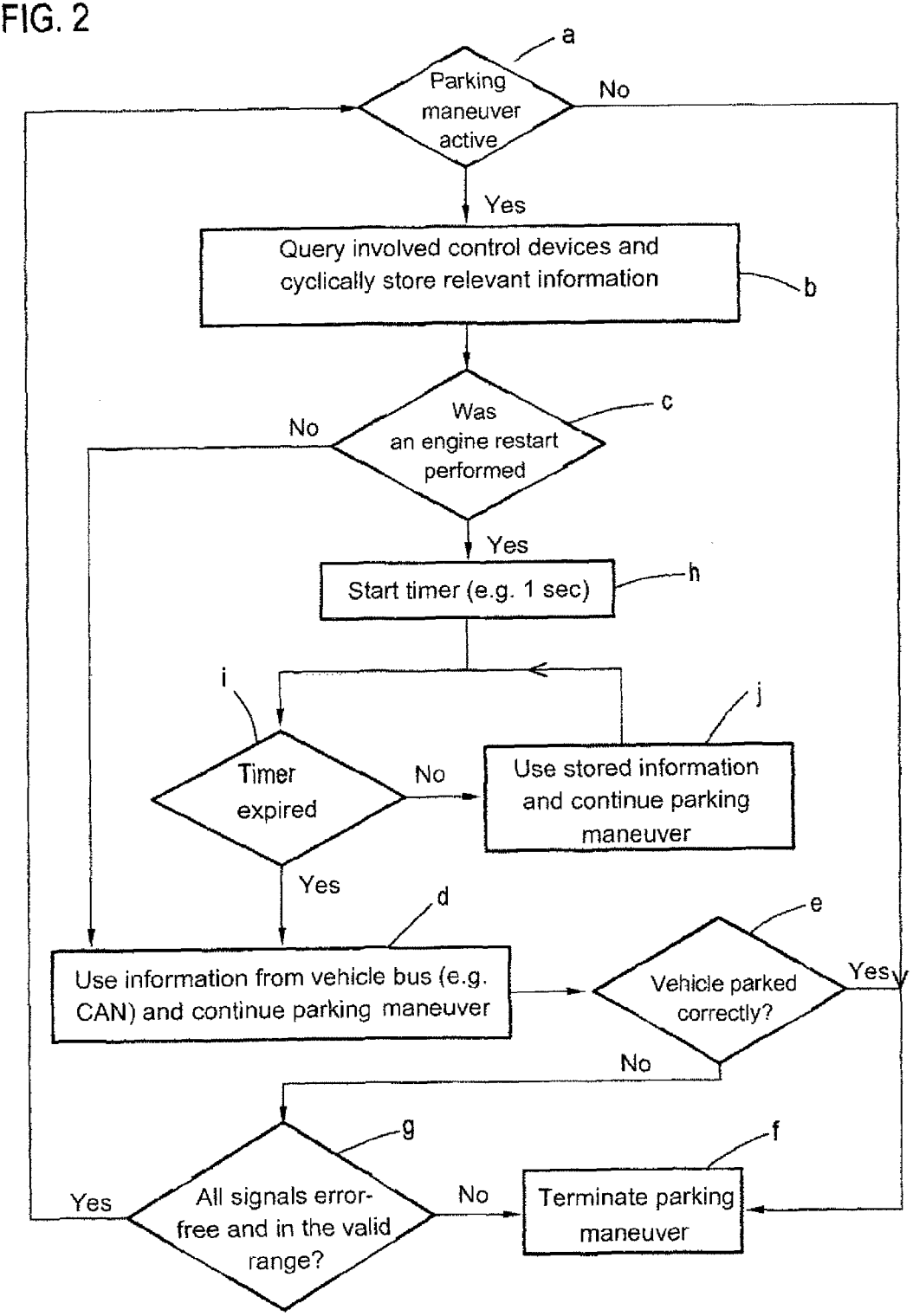

METHOD OF OPERATING A MOTOR VEHICLE HAVING A PARKING ASSISTANCE SYSTEM

CROSS-REFERENCES TO RELATED APPLICATIONS

This application is the U.S. National Stage of International Application No. PCT/EP2013/001549, filed May 25, 2013, which designated the United States and has been published as International Publication No. WO 2013/189563 and which claims the priority of German Patent Application, Serial No. 10 2012 012 265.9, filed Jun. 20, 2012, pursuant to 35 U.S.C. 119(a)-(d).

BACKGROUND OF THE INVENTION

The invention relates to a method of operating a motor vehicle having a parking assistance system with a system controller which receives one or more items of information from other controllers or units when performing an assisted parking maneuver, as well as a motor vehicle having an internal combustion engine.

Modern cars are equipped with various assistance systems. A particularly popular assistance system is a parking assistance system, which supports or fully automatically performs the reverse parking maneuver. Such system is known, for example, from DE 10 2005 017 359 A1. The system disclosed therein performs a safety test of relevant system parameters, whereby the parking assistance is disabled as necessary, i.e. in the event of an error. According to DE 10 2010 020 202 A1, the parking assistance system is also disabled when an engine stall is detected. If the parking assistance system is active during an engine stall, it is automatically disabled, whereas when it is not yet active, its activation is automatically prevented. An engine stall may occur, for example, when the engine is choked off. Deactivation occurs for safety reasons and is necessary because controllers that supply information to the system controller of the parking assistance system, e.g. from other sensors or units, perform a reset in the event of an engine restart. It is then no longer guaranteed that any signals are transmitted at all, or that the transmitted signals are correct. If the signals or information, respectively, are not correct, then this could cause the parking maneuver to be performed incorrectly, thereby damaging the own or other vehicles. When the engine is stalled or stopped as a result of the deactivation and the inevitable termination of a previously initiated parking maneuver that is assisted by the system, the driver is thus in the event of a restart faced with the problem that for example after he has entered the parking space halfway, he must now continue to park without the assistance system.

The invention is therefore based on the problem to ensure availability of the parking assistance system, even when the engine dies during an ongoing parking maneuver, for whatever reason.

SUMMARY OF THE INVENTION

To solve this problem, the invention provides in a method of the aforementioned type, that the current information supplied by the other controllers or units is continuously stored in the system controller, and that during a restart of the internal combustion engine that has previously stalled during the ongoing parking maneuver, the system controller accesses the previously stored information, which information is then used as a basis for continuing the parking maneuver during a defined time interval, whereafter new currently acquired information from the controllers or units is used for the assistance.

According to the method of the invention, the information continuously supplied by other controllers or units may be processed not only during the parking process in the context of ongoing assistance, but also saved. Such information primarily includes status or functional information from other controllers or units that are associated, for example, with other assistance systems, but which are necessary for controlling the parking maneuver and its assistance, respectively. This also includes information about the current speed or the selected gear level and the like. Now, when the internal combustion engine is stopped during the ongoing parking maneuver for whatever reason, for example, by being choked off, and when shortly thereafter a restart of the engine takes place, the system controller can revert back to the last stored information in the system controller, and use this information for a predetermined, defined time interval for the subsequent assistance of the then immediately reactivated parking assistance system. This means that the system controller starts from the status quo that existed immediately before the engine stopped. In this way, on one hand, the assistance can resume its operation immediately while, on the other hand, the other controllers supplying the information can be given time to perform the required reset that is required for safety reasons.

This "old" information is used, as described above, as a basis during a defined time interval. The time interval is selected so as to ensure that, after the time interval has elapsed, all controllers or units are active again, i.e. can supply current information. This current information is then, at the latest after the expiration of the time interval, used as basis for the continued assistance. All information is supplied by the controllers or units via a vehicle bus, such as the CAN-bus, and can be accessed by the system controller via the bus.

Advantageously, a plausibility check of the new, current information may be performed after the restart, in particular with reference to the stored information. The assisted maneuver is continued when the test result is positive and aborted when the test result is negative, since it may, of course, happen that an error occurs when resetting an external controller or unit, so consequently the provided current information is in a form that cannot be used as the basis for a parking assistant, or that it is in a form that it is not compatible with the recently acquired and stored "old" information. The parking assistance can either continue or be aborted depending on the outcome of such a plausibility check.

The time interval is at least 100 ms and maximally 5 seconds, and is preferably parameterizable, i.e. it can ultimately be adjusted as needed.

Within the context of this parameterization, a common time interval may be used for all the items of information or may be associated with all external controllers and units, respectively. This means that regardless of the controller which still has the "old" information, this information is used as the basis for the same length of time following a restart, namely during a single common time interval.

Alternatively, individual parameterizable time intervals may be used for different items of information. Depending on the controller or unit that supplies external information to be considered as part of the parking assistance, the reset after restart may take different lengths of time. For example, a transmission controller providing information about the engaged gear can usually perform a reset faster than a controller associated with an electronic stability program, i.e. an ESP-controller which takes longer for the reset, since its functions are more complex. It is now conceivable to assign to the different ECUs (but also to the other embedded controllers or units) corresponding individual time intervals of different lengths, which can be parameterized accordingly.

As mentioned above, different items of information may be used as information. For example, information indicating the functional status of a controller associated with an electronic parking lock and/or the functional status of a controller associated with an electronic stability program and/or information indicating the selected drive level and/or the actual speed may be captured as information and stored. The items of information indicating the functional status ultimately indicate the operational readiness of the operating system or assistance system, with which the respective controller is associated. For example, if a sensor integrated an ESP-system is defective, then the information indicates an error of the entire system, thus canceling the assistance from the parking system. In addition, it may also be advantageous to store, in addition to these items of information, also information indicating the status of the system controller itself and to consider this information within the interval, because the own functional status, which must of course be error-free, may have to be considered to perform the assistance.

In addition to the method itself, the invention also relates to a motor vehicle, which is configured for carrying out this method and thus includes a parking assistance system, with a system controller that supports or automatically controls the parking maneuver, and to which items of information from other controllers or units installed in the vehicle can be provided via an onboard vehicle bus. This system controller is capable of continuously storing the corresponding items of information and to use them as a basis during a predetermined time interval in the event of an accidental engine stop and restart, until the external controllers/units again provide current items of information following a reset during the restart, which are henceforth used for the assistance.

BRIEF DESCRIPTION OF THE DRAWINGS

Further advantages, details and features of the invention will become apparent from the exemplary embodiment described hereinafter and with reference to the drawings. The drawings show in.

DETAILED DESCRIPTION OF PREFERRED EMBODIMENTS

Figure 1:
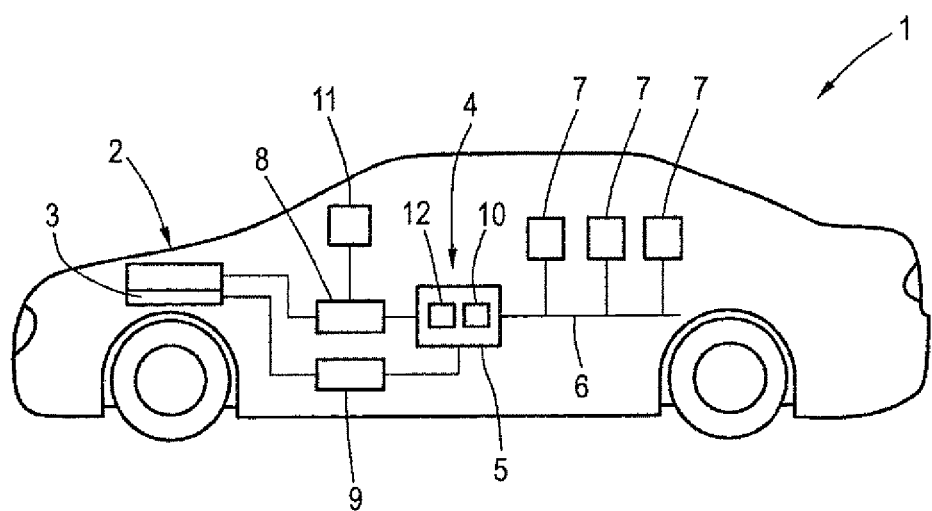
FIG. 1 a motor vehicle according to the invention, and
FIG. 2 a flow diagram for explaining the method.

FIG. 1 shows a motor vehicle 1 according to the invention including an internal combustion engine 2 with an associated transmission 3, and a parking assistance system 4 with a system controller 5, which is connected to a vehicle bus 6, to which a number of additional controllers 7 are connected. An engine controller 8 is associated with the internal combustion engine 2 and a transmission controller 9 is associated with the transmission 3.

The system controller 5, which automatically controls a parking maneuver upon activation of the parking assistance system 4, or at least supports the parking maneuver if the parking maneuver is performed manually, continuously receives items of information for performing its duties via the bus 6 from the controllers 7 or from the engine controller 8 and the transmission controller 9, respectively. These items of information are continuously stored in a memory 10, whereby the previously stored information is overwritten, preferably after receipt of updated information from a controller, so that the latest information data set is always available and stored.

If the internal combustion engine now turns off during an assisted parking maneuver, either by stalling or by inadvertently switching off the ignition, then the parking maneuver is immediately terminated, i.e. the assistance is abruptly terminated. When the driver then begins a restart, i.e. when the internal combustion engine is restarted, the ignition 11 is operated first, which then sends a signal to the engine controller 8, which then initiates the restart. This signal supplied to the engine controller 8, or the restart signal supplied from the engine controller 8 is considered as a trigger signal for a timer 12, which is associated with the system controller 5. This timer defines a time interval within which the current items of information still remaining in the memory 10 and stored just before the inadvertent turn-off the internal combustion engine 2 are read by the various controllers and used as a basis for an immediate further assistance of the parking assistance system 4, meaning that the system controller 5 accesses this previously stored items of information. The controllers 7 and the controller 8 and the transmission controller 9, respectively, may be busy during a short period of time immediately after the restart signal has been sent and are hence not capable of providing currently acquired items of information, in particular their own status information, relating to the correctness of the associated system. The system controller 5 now uses as these items of information the "old" items of information that were stored just before the engine turned off. This time interval may be a minimum of 100 ms, and should be a maximum of 5 s, wherein time intervals of different lengths can be associated with individual controllers, depending on how fast they can perform their own reset and are then again able to supply current items of information, in particular items of information that describe their own functional status as error-free or incorrect.

The system controller 5 is capable of performing a plausibility check as soon as the first currently acquired items of information are received again. These items of information can be compared, for example, with the still previously used, stored "old" items of information. When a match is found, the items of information can henceforth be used, if not, the parking maneuver can be immediately and automatically terminated again. It will be understood that the content of the current incoming items of information is generally checked by the system controller 5 and these items of information are then used only when their content is correct, i.e. in particular the correctness of the function of the individual controllers 7, 8 and 9 and the associated system, respectively, is indicated.

FIG. 2 shows a flow diagram describing the actual operation of parking assistance system 4. In step a, it is checked whether a parking maneuver is active, and therefore, whether the driver assistance system 4 is activated. If this is the case (yes), then a safety query is performed in step b, i.e. the involved controllers 7, 8 and 9 are queried and relevant information indicating the status is cyclically stored.

In step c, it is queried whether an engine restart was performed. If this is not the case (no), which would be typical, then, see steps b, the current items of information still received from the controllers 7, 8 and 9 via the vehicle bus 6 will still be used, and the parking maneuver is continued. In step e, it is finally queried whether the vehicle is parked correctly. If this is the case (yes), then the parking maneuver is terminated in step f. If this is not the case (no), then it is checked in step g, whether all the items of information (respective signals) are error-free and located in the valid range. If this is the case (yes), the loop returns to step a. If this is not the case (no), i.e. if incorrect status information has been received (a controller or a system fails to operate properly), then the parking maneuver is terminated again according to step f.

If step c indicates that an engine restart was performed (yes), which is recognized immediately, as stated previously, from a corresponding signal from the ignition or the engine controller, the timer 12 is started according to FIG. 1 (step h), wherein the time interval has a duration of, for example, one second.

In step i, is queried whether the timer 12 has expired. If this is not the case, which is the case immediately after the timer is started (no), then the stored information that is available in the memory 10 of the system controller is used, and the parking maneuver will be continued in step j. There is an ongoing query whether the timer has expired (step i), wherein the stored items of information are used until the timer and thus the time interval have expired (yes following step i). The method then continues with step d, wherein the current items of information terminated by the reset and current information supplied by the controllers 7, 8 and 9 are used again, and the parking maneuver is continued with the steps e, f and g, respectively, or by re-executing the loop.

What is claimed is:

1. A method of operating a motor vehicle with an internal combustion engine and a parking assistance system having a system controller and additional controllers or units, the method comprising:
    while performing an assisted parking maneuver, receiving with the system controller one or more items of information from the additional controllers or units and storing the received items of information in the system controller,
    during a restart of the internal combustion engine that stalled while the assisted parking maneuver is performed, accessing with the system controller the previously stored items of information, and using the previously stored items of information as a basis for continuing the assisted parking maneuver during a specified time interval following the restart,
    thereafter using current items of information acquired by the additional controllers or units for performing the assisted parking maneuver,
    checking the current items of information received during the specified time interval from the additional controllers or units for plausibility with respect to the stored items of information, and
    continuing the assisted parking maneuver when a result from the plausibility check is positive, and terminating the assisted parking maneuver when the result from the plausibility check is negative.

2. The method of claim 1, wherein the specified time interval is at least 100 ms and at most 5 seconds.

3. The method of claim 1, wherein the specified time interval is parameterizable.

4. The method of claim 1, wherein the specified time interval is individually parameterizable for different items of information.

5. The method of claim 1, wherein the items of information comprise information that indicates at least one of a functional status of a controller associated with an electronic parking lock, a functional status of a controller associated with an electronic stability program, a selected drive level, and an actual speed of the motor vehicle, the method further comprising storing the items of information.

6. The method of claim 5, wherein the items of information further comprise information indicating a status of the system controller itself, which is also stored and taken into account during the specified time interval.

7. A motor vehicle comprising an internal combustion engine and a parking assistance system having a system controller and additional controllers or units, wherein the system controller is configured to perform an assisted parking maneuver by:
    receiving with the system controller one or more items of information from the additional controllers or units and storing the received items of information in the system controller,
    during a restart of the internal combustion engine that stalled while the assisted parking maneuver is performed, accessing with the system controller the previously stored items of information, and using the previously stored items of information as a basis for continuing the assisted parking maneuver during a specified time interval following the restart,
    thereafter using current items of information acquired by the additional controllers or units for performing the assisted parking maneuver,
    checking the current items of information received during the specified time interval from the additional controllers or units for plausibility with respect to the stored items of information, and
    continuing the assisted parking maneuver when a result from the plausibility check is positive, and terminating the assisted parking maneuver when the result from the plausibility check is negative.

* * * * *